United States Patent [19]
Rhodes

[11] 3,778,772
[45] Dec. 11, 1973

[54] STATION INTERFACE UNIT FOR PROCESS CONTROL OF A DIRECT DIGITAL CONTROL AND/OR SUPERVISORY CONTROL SYSTEM

[75] Inventor: Russell R. Rhodes, Marlboro, Mass.

[73] Assignee: Honeywell Information Systems Inc., Waltham, Mass.

[22] Filed: May 31, 1972

[21] Appl. No.: 258,304

[52] U.S. Cl. .............................. 340/163, 340/150
[51] Int. Cl. ........................................... H04q 9/00
[58] Field of Search ................... 340/150, 163, 167; 235/151

[56] References Cited
UNITED STATES PATENTS 3,557,349   1/1971   Griem, Jr. ...................... 340/167 R
3,576,535   4/1971   Turner ............................ 340/150 X Primary Examiner—Donald J. Yusko
Attorney—John M. Gunther et al.

[57] ABSTRACT

A station interface unit provides to any one of a plurality of remote stations a control signal for effectuating a change in that station's total charge. With a different charge the selected station's operation is altered. The control signal is a current having a fixed amplitude and a variable duration time period. A two polarity current source provides for either a positive or negative control signal. Upon completion of the control signal's variable duration time period, an interrupt signal is generated which indicates that another control signal may be provided to any one of the plurality of remote stations.

13 Claims, 10 Drawing Figures

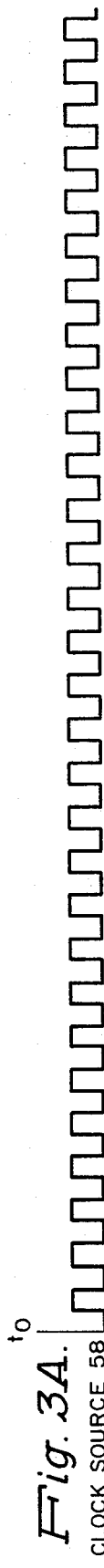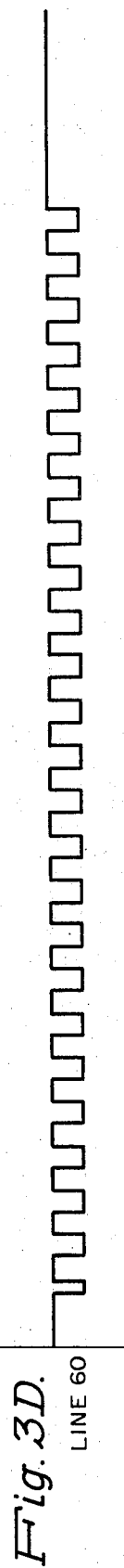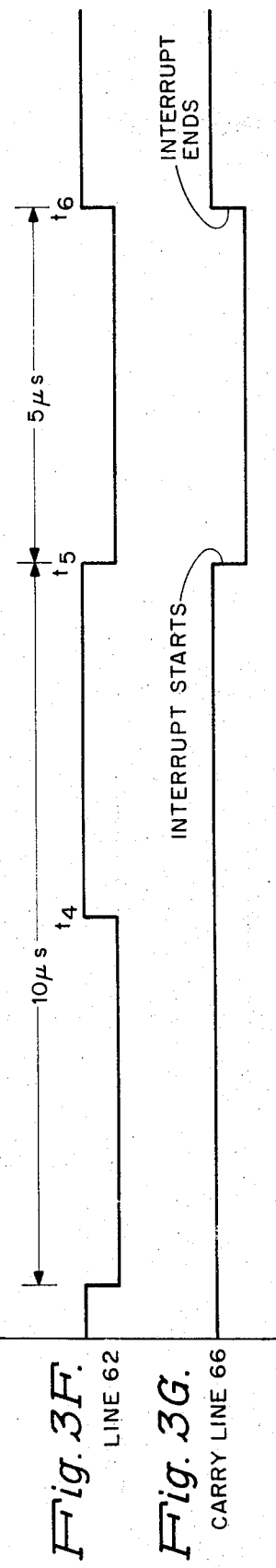

3,778,772

STATION INTERFACE UNIT FOR PROCESS CONTROL OF A DIRECT DIGITAL CONTROL AND/OR SUPERVISORY CONTROL SYSTEM

BACKGROUND OF THE INVENTION

A. Field of the Invention

This invention relates generally to process control between a digital computer control system and a remotely located direct digital control or supervisory control system and more particularly to a station interface unit between the digital computer and the remote system.

B. Description of the Prior Art

Control systems, for use in remote stations, are known wherein a plurality of conrolled elements are supervised or controlled by remote control units. These control systems are known as direct digital control (DDC), supervisory control, remote control or by similar nomenclature. Each operation of a control system, e.g. a new valve setting for a chemical manufacturing process, is determined by an analog voltage level stored on a high quality holding capacitor. When the analog voltage level is changed, the operation being performed is simultaneously altered. In order to ascertain when a change is necessary, the remote station communicates its present status to a digital computer. If the computer determines that the present status of the station should be changed, the computer enables a station interface unit to deliver a control signal to the remote station. This control signal changes the charge level of the remote station such that a desired operation, e.g. opening or closing of the valve, is performed.

The station interface unit of the prior art provided control signals which altered the charged level on an integrator of a remote station. These control signals, however, were for an unchanging time period. In order to provide a variable charge during a fixed time period, i.e. depending on the charge the remote station required, the prior art altered the current level of the control signal. To achieve this amplitude control, the prior art required a plurality of very complex and costly hardware circuits. Moreover, additional circuitry was needed to prevent the control signals from accidentally being sent to the wrong remote station. More particularly, a digital to analog converter was needed to transform the computer determined value into an analog voltage and a single-pole-double-throw electronic switch was usually required in order to prevent a voltage-to-current converter from saturating when not connected to the station. Other required circuitry included relays to pass the output of the voltage-to-current converter to the selected station, power flip-flops to store the station address and to drive the relays, a power supply for the relays and several one-shot multivibrators to control the duration of two intervals totaling approximately 6 milliseconds. While this interface circuit has been considered to be a satisfactory solution, it suffers from the following difficulties:

1. it is possible to select several relays at once, thereby inadvertently selecting several stations at once;

2. it is inaccurate since the one-shot multivibrator produces pulses whose width is temperature dependent;

3. the design of the voltage-to-current converter is quite complex since an extremely high output impedance to provide the predetermined current level is needed;

4. a fairly slow operation results because of the 6 millisecond timing period; and 5. numerous components and many modules in a real time interface subassembly are necessary for implementation.

OBJECTS OF THE INVENTION

It is an object of this invention to overcome these prior art limitations and to provide a station interface unit which is relatively simple in configuration and small in size.

It is a further object of the invention to provide a station interface unit which is highly accurate.

It is another object of this invention to provide a station interface unit which is substantially faster than the station interface unit of the prior art.

It is another object of this invention to provide a station interface unit which is much less expensive than previous station interface units.

SUMMARY OF THE INVENTION

The foregoing objects are achieved according to one embodiment of the invention and according to one mode of operation thereof, by providing in a control system a station interface unit which provides a control signal to a remote station. The control signal is determined by a data word sent from a computer to a plurality of registers. Based on discrete portions of the data word, a first register selects one of a plurality of stations, a second register determines the polarity of the control signal, and a third register determines the duration of the control signal. A current source provides the control signal as a constant current. When the control signal is completed, an interrupt signal is provided which indicates that the present operation has been completed.

BRIEF DESCRIPTION OF THE DRAWINGS

The novel features which are characteristic of this invention are set forth with particularity in the appended claims. The invention itself, however, both as to its organization and operation together with further objects and advantages thereof may best be understood by reference to the following description taken in connection with the accompanying drawings in which:

FIGS. 3A–G are timing diagrams illustrating the sequential operation of the interface unit of FIG. 2.

DETAILED DESCRIPTION OF THE PREFERRED EMBODIMENT

Figure 1:
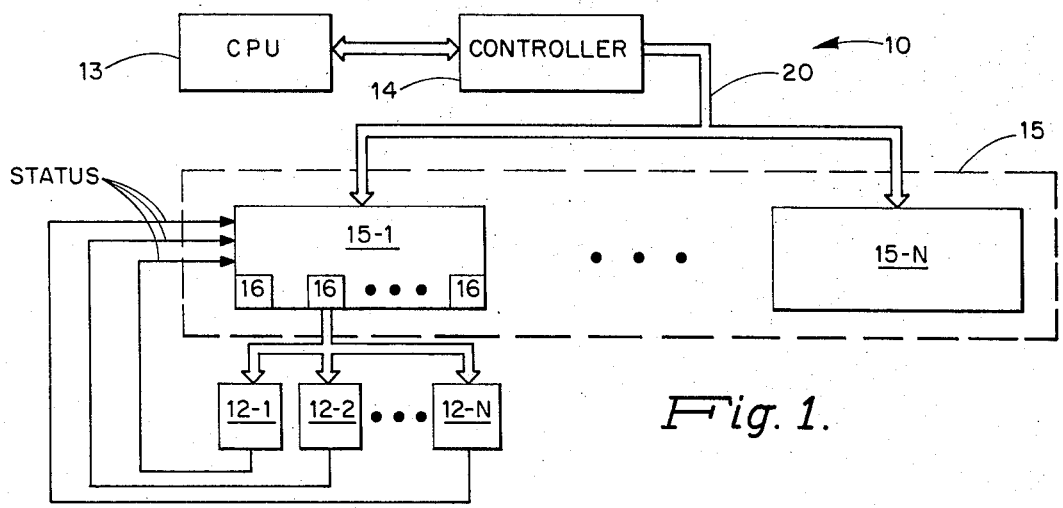
FIG. 1 is a block diagram illustrating a real time system within which the interface unit of the invention operates.

FIG. 1 illustrates the overall system in which the station interface unit of the present invention is used. More particularly, FIG. 1 shows a real time system 10 having a plurality of remotely located stations 12, only one being described for illustrative purposes. The purpose of the real time system 10 is for example to control the mechanical positioning of control valves, to sample a transducer, or to provide discrete operations on as assembly line. In order to perform these operations, a real time system has a plurality of stations 12, each station containing a capacitor for holding a plurality of stations 12, each station containing a capacitor for holding a plurality of different charge levels, each charge level effectuating a unique operation. Each station 12 is connected to a digital computer 13, hereinafter referred to as a CPU, by means of a controller 14 and a digital input/output (I/O) subsystem 15. The CPU 13 contains an incremental control algorithm which establishes and controls the operation for each of the plurality of stations 12. The controller 14 provides for bidirectional data buffering and serves as an interface between the CPU 13 and the digital I/O subsystem 15. The digital I/O subsystem 15 is one subsystem of the real time interface and includes a plurality of units 15–1 ... 15–N, each unit comprising a plurality of station interface units 16 of the present invention. For illustrative purposes, sixteen station interface units 16 are provided in each unit 15–1 ... 15–N, each station interface unit 16 connecting sixteen remote stations 12.

After the status of the plurality of stations 12 has been determined by the CPU 13 and the incremental control algorithm indicates a change for one of the stations is necessary, CPU 13 provides a data word on bus 20 to the corresponding station interface unit 16 via controller 14 and digital I/O subsystem 15. This data word on bus 20 contains information which indicates to the station interface unit 16 the particular station to be updated and the charge level required by the selected station 12 to perform the desired operation. To effect the new charge level the station interface unit 16 provides a control signal to the selected station 12. This control signal is a constant current of selected polarity for a calculated time period. The polarity of the constant current is determined by whether the total charge level is to be incremented or decremented. Since the charge transmitted is constant, the time period is varied depending on the amount of charge the station 12 requires. This time period and hence the control signal can vary from 10 microseconds to 2.5 milliseconds.

Figure 2:
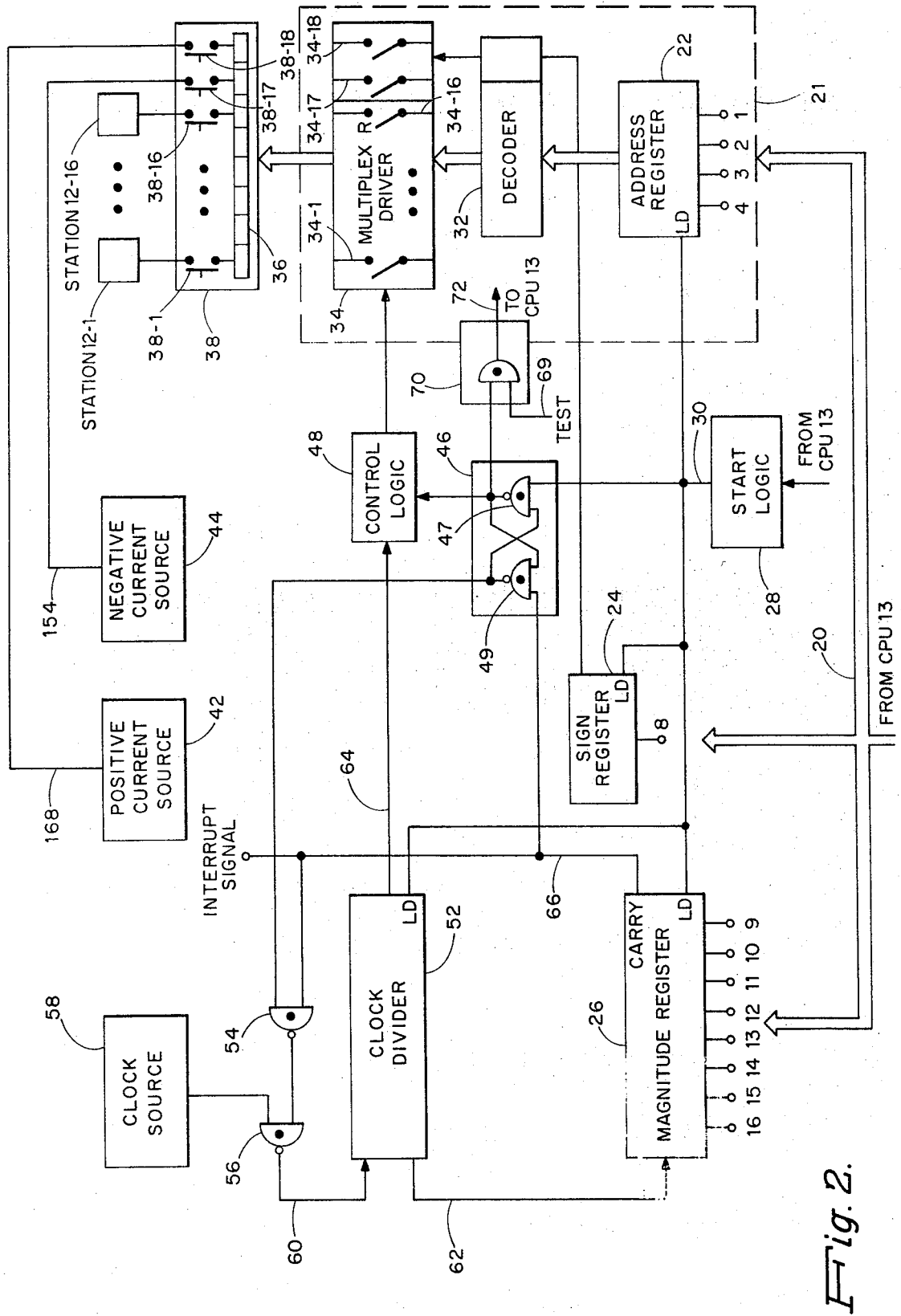
FIG. 2 is a block diagram illustrating the configuration of the interface unit.

The station interface unit 16 is shown in greater detail in FIG. 2. More particularly, an interface unit 16 receives a data word in the digital I/O subsystem 15 having, for example, sixteen bits. This data word is stored in three temporary storage registers 22, 24, 26 via bus 20. In the preferred embodiment, the first four bits are stored in an address register 22 which is part of address unit 21. These four bits identify which one of the plurality of stations 12 is to be updated. In this example, sixteen stations are connected to one interface unit. If more or less stations were connected, the number of bits utilized would be modified accordingly. Bits 5 to 7 of the data word are not discussed since they are not needed for purposes of this invention. The eighth bit of the data word is provided to sign register 24. Sign register 24 determines the polarity of the control signal to be transmitted. The remaining eight bits of the data word, i.e, bits 9 through 16, are provided to a magnitude register 26. Magnitude register 26, in addition to being a temporary storage register, is also a binary counter and provides the time period during which a control signal is transmitted to a station 12. Depending on the value represented by the eight bits, magnitude register 26 can provide for a 10 microsecond to a 2.5 millisecond time period. A standard circuit SN 74193 found in the Integrated Circuit Catalog for Design Engineers, First Edition, by Texas Instruments on page 9–57 may be an example of magnitude register 26.

Address register 22, sign register 24 and magnitude register 26 are connected to start logic 28. When a start pulse is received from CPU 13, start logic 28 transmits a pulse over line 30, enabling each of the registers 22, 24, 26 to receive in parallel the above enumerated bits of the data word on bus 20 from CPU 13. For start logic 28 to be effective, the data word on bus 20 must be stable just prior to, during, and just following the initiate signal from CPU 13.

An address unit 21 for selecting a desired station 12 to be updated includes address register 22, a decoder 32 and a multiplexer driver 34. Decoder 32 is a typical circuit which, in this preferred embodiment, decodes the information of the four bits contained within address register 22 and selects one of 16 possible lines within multiplexer driver 34. Multiplexer driver 34 may be a monolithic integrated MOSFET drive circuit and is designed to provide a voltage signal sufficient to drive switches 38. An exemplary circuit for multiplexer drive 34 is described in a Sept., 1970 publication of Siliconix Incorporated under the description of D125PK. Multiplexer driver 34 may contain eighteen bipolar transistor switches 34–1 ... 34–18. Switches 34–1 to 34–16 are coupled to decoder 32 via address register 22 while switches 34–17 and 34–18 are coupled to decoder 32 via sign register 24.

Multiplexer driver 34 is also coupled to a bus bar 36 which in turn is connected to a plurality of switches 38 which may be of MOSFET design. Switches 38 may be monolithic integrated circuits with drive switches and are described in the same Siliconix Incorporated publication. Reference G115BK is an exemplary description of a possible integrated circuit. Switches 38–1 to 38–16 are enabled by decoder 32 via multiplexer driver 34, and switches 38–17 and 38–18 are enabled by sign register 24 via decoder 32 and multiplexer 34. Each MOSFET switch 38–1 to 38–16 is connected at one end to bus bar 36 and at its other end to one of a plurality of stations 12. Switch 38–17 is connected at its one end bus bar 36 and at its other end to negative current source 44 via line 154. When switch 38–17 is enabled, a negative polarity control signal is transmitted to one of the plurality of stations 12 decrementing the charge level of the station. Switch 38–18 is connected to positive current source 42 via line 168 and when enabled provides a positive polarity control signal from station 12 incrementing the charge level of the station. In order to change the charge level of a station 12, one of switches 38–1 to 38–16 must be enabled and also one of switches 38–17 or 38–18 must be enabled. Current sources 42, 44 are described in greater detail with reference to FIG. 4.

Start logic 28 also provides a signal to busy logic 46 via line 30. Busy logic 46 which may be two NAND gates 47, 49 is a flip-flop which performs two functions. First, it provides a signal to control logic 48 via gate 47. Control logic 48 may be a D type flip-flop and can be found in the same Integrated Circuits Catalog. Circuit type SN 7474 on page 6–55 may be used. When triggered, control logic 48 provides a signal to multiplexer driver 34 permitting selection of one of the plurality of stations. Second, busy logic 46 through gate 49 enables a clock divider 52 via gates 54 and 56 here shown as NAND gates. Clock divider 52 is a binary counter which increases the duration of pulses it receives while lessening the frequency. An example of the clock divider is found in the same Integrated Circuit Catalog. Circuit type SN 74193 on page 9-57 may be used.

In the preferred embodiment, clock divider 52 receives pulses from clock source 58 via gate 56. Clock source 58, by way of example, may be a 1.6 megahertz crystal oscillator. When gate 56 receives an enabling signal from busy logic 46, it provides pulses from source 58 over line 60 to clock divider 52. Clock divider 52 in turn transfers one pulse to magnitude register 26 for each sixteen pulses received from clock source 58. Clock divider 52 also provides a pulse to control logic 48 via line 64 for every two pulses it receives from clock source 58. With the first pulse received from clock divider 52, control logic 48 is enabled and provides a signal to multiplexer driver 34. Multiplexer driver 34 uses the signals from decoder 32 and control logic 48 to enable its operation.

Each pulse from clock divider 52 to magnitude register 26 changes the value represented by the stored eight bits. In this embodiment, each pulse increments the value; however, it could just as easily decrement the value with the same results. When the eight bits have reached a maximum value, magnitude register 26 overflows indicating via a signal provided over carry line 66 that the charge period is completed. This signal is a 5 microsecond interrupt signal which enables two operations. First, it resets busy logic 46 which provides a disabling signal to control logic 48 such that control logic 48 provides no further output. Second, it delivers a signal to gate 54 to enable the clock pulses being delivered to clock divider 52 to continue until the interrupt signal is completed. Since the interrupt signal over carry line 66 has a duration of 5 microseconds, an inherent delay is provided which allows switches 38 to be turned off.

In order to ensure that the computer can determine when the interface unit 16 is in operation, test logic 70 is provided. Test logic may be an AND gate which has one input coupled to the output of busy logic 46 and its other input coupled to a test line 69. To determine if the interface unit 16 is enabled, a test signal is applied over test line 69. If busy logic 46 is enabled, a signal via test line 72 is provided to CPU 13 indicating that the next update sequence should be delayed.

Figure 4:
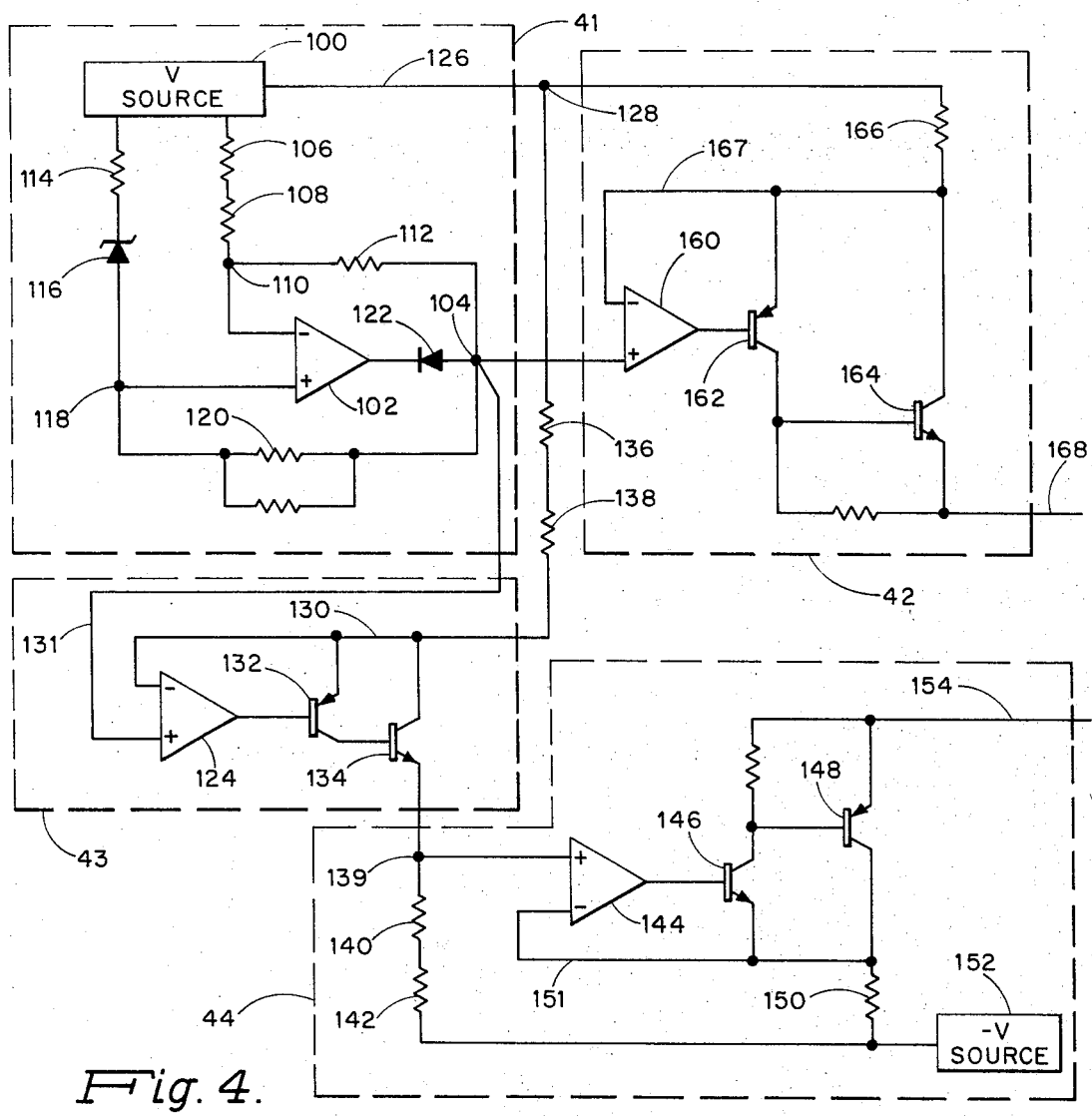
FIG. 4 is a schematic illustration of the two polarity current source utilized in the interface unit of FIG. 2.

The two polarity current source will now be described with reference to FIG. 4. A voltage reference 41 comprises a voltage source 100 which for illustrative purposes provides a positive 23 volts. Connected to voltage source 100 is an operational amplifier 102 which develops a precision voltage of 9.76 volts between its output junction 104 and the voltage source output line 126. Operational amplifier 102 accomplishes this by using both positive and negative feedback. More specifically, operational amplifier 102 has its negative lead coupled to junction 110. Fixed resistors 106 and 108 are connected in series between junction 110 and voltage source 100. Fixed feedback resistor 112 is connected between junctions 104 and 110. Resistor 106 is used in calibrating the total current source and essentially trims the precision voltage reference. Resistor 108 is a precision resistor. A precision register as used herein is a resistor having the ability to hold the same value as a function of temperature rather than having the characteristic of absolute accuracy. The trim resistor 106 provides for overall accuracy. The combination of resistors 106, 108 and 112 provides for a highly accurate and fixed first voltage to operational amplifier 102.

The positive voltage to operational amplifier 102 is developed by resistor 114 and a Zener diode 116 connected in series between junction 118 and voltage source 100. Resistor 114 is a trim resistor used to calibrate the total current source. Zener diode 116 provides a fixed voltage reference. A resistor 120 is connected between junctions 104 and 118 in a feedback relationship. The voltage across feedback resistor 120 is determined by the output current from operational amplifier 102. Since this output current is created by fixed value resistors 106, 108, 112 and a fixed voltage source 116, a precise voltage is developed across feedback resistor 120. The current flow in Zener diode 116 is determined by the voltage across feedback resistor 120 thus ensuring a highly precise calibration of operational amplifier 102. Diode 122 is provided so that the output of operational amplifier 102 does not swing in the wrong direction at power turn off.

Current source 43 provides a voltage reference for current source 44. Current source 43 includes an operational amplifier 124 which receives a voltage from voltage source 100 via line 126, junction 128, resistors 136, 138 and line 130 connected to its positive lead and a second voltage from junction 104 via line 131 connected to its negative lead. The output of operational amplifier 124 is connected to the base of PNP transistor 132 which has its collector connected to the base of NPN transistor 134. Both the emitter of transistor 132 and the collector of transistor 134 are connected to line 130 and develop a low loss current source output to junction 139 via the emitter of transistor 134. Trim resistor 136 and precision resistor 138 provide a precision voltage such that a precision current is developed through resistor 140 of negative current source 44.

Positive current source 42 provides a 4.88 milliamp current to bus bar 36. Positive current source 42 includes an operational amplifier 160 which receives two precision voltages. A precision 9.76 volts is received at the positive lead to operational amplifier 160 while the negative lead to operational amplifier 160 is connected to voltage source 100 via line 126, junction 128, precision resistor 166 and feedback line 167. Operational amplifier 160 provides a precision output voltage to the base of PNP transistor 162. Once enabled, PNP transistor 162 provides a current via its collector to the base of NPN transistor 164 which in turn provides a positive current source output over line 168 to bus bar 36 of FIG. 2.

Negative current source 44 includes operational amplifier 144, NPN transistor 146, PNP transistor 148 and precision resistor 150. Negative current source 44 is essentially an inverted positive current source and operates in the same manner as described above. Thus, the positive lead to operational amplifier 144 is the precision voltage developed across resistor 140 at junction 139. The negative lead is provided by negative voltage source 152, precision resistor 150, and feedback loop line 151. Negative voltage source 152 provides minus 23 (−23) volts. Operational amplifier 144 provides a precision output voltage to the base of NPN transistor 146. Once enabled, NPN transistor 146 provides a current via its collector to the base of PNP transistor 148 which in turn provides a highly precise current source to receive the current from the bus bar 36 of FIG. 2 via line 154.

The two polarity current source operates as follows. The output of voltage reference 41, i.e., junction 104 and the output of level shift voltage reference, i.e., junction 139 are used to drive operational amplifiers 160 and 144, respectively. These operation amplifiers are connected in a voltage follower mode causing the precision voltage of each reference to be impressed across the precision resistors 166 and 150, respectively. The resultant current in these resistors is a precision voltage. To minimize errors in the current source output due to loss or addition of base current the input the current source output stage, compound transistor pairs 162, 164 and 146, 148 are used for current source outputs. These compound transistors have such high effective current gains that essentially the entire emitter current flows in the collector. Each current source produces a current having a value of 4.88 milliamps for each selected station. Thus, a highly accurate two polarity current source is used.

The overall operation is now described taking into account FIGS. 3A to 3G which show a timing diagram for the station interface unit 16. For purposes of explanation it is assumed that remote station 12-1 is to be updated and that a small incremental charge is needed to obtain the desired voltage level. In order to provide this incremental charge, it is assumed that the CPU 13 has determined that only one binary count, i.e., 10 microseconds, is necessary for the updating operation to occur.

At time $t_o$, clock source 58 is operative and produces pulses at the rate of 1.6 megahertz as shown in FIG. 3A. Gate 54 provides a low signal output since the input from carry line 66 is high as shown in FIG. 3G and the input from busy logic 46 is high. Since gate 56 has a low input signal from gate 54, the output of gate 56 is inhibited and the clock pulses form clock source 58 are not transferred.

Prior to time $t_o$, CPU 13 receives a signal from station 12-1 and its incremental control algorithm indicates that a small incremental charge for station 12-1 is necessary. In response to this condition, CPU 13 provides a data word on bus 20 which will permit this operation to occur. At time $t_1$, CPU 13 provides a start pulse to start logic 28 as is shown in FIG. 3B. This pulse enables start logic 28 and a low signal is provided over line 30 as is shown in FIG. 3C. This low signal enables address register 22, sign register 24 and magnitude register 26. Each register 22, 24, 26 is then loaded with the corresponding bits of the data word sent by CPU 13 on bus 20. At time $t_2$, the start pulse from CPU 13 is removed, as shown in FIG. 3B, and start logic 28 is disabled. As a result start logic 28 provides a high signal over line 30 which fixes the data word delivered to the registers 22, 24, 26.

Busy logic 46 is also connected to start logic. When the output of start logic 28 goes low, gate 47 has a high input from the lead connected to gate 49 and a low input from start logic 28. As a result the output of gate 47 goes from low to high. This high output from gate 47 enables control logic 48. The high signal also provides one input to gate 49. Since the other input from carry line 66 is high, the output of gate 49 changes from high to low. This low output signal of gate 49 enables gate 54 and its output signal goes from low to high. As a result, gate 56 is enabled and the output clock pulses from clock source 58 are transmitted over line 60 as shown in FIG. 3D. The low output from gate 49 also provides a low input to gate 47. When start logic 28 goes high after the data has been entered, gate 47 will remain unchanged becuase of the output signal from gate 49. Clock divider 52 is also enabled when the signal on line 30 goes high.

Once the information in the registers has been fixed, the contents of the address register 22 are decoded by decoder 32. Decoder 32 cannot activate the selected transistor switch 34-1 . . . 34-16 of multiplexer driver 34 until control logic 48 also provides a signal. Sign register 24 is also decoded by decoder 32 such that the control signal polarity is provided to the input of switches 34-17 or 34-1 of multiplexer driver 34. The polarity signal also must await the control logic 48 signal.

With the leading edge of the clock pulse immediately following the termination of the start pulse, i.e., at time $t_3$, clock divider 52 provides one series of pulses over line 64 to control logic 48. These pulses are provided at the rate of one pulse over line 64 for each two pulses over line 60. Since control logic 48 has been enabled by busy logic 46, the rising edge of the first clock pulse triggers it to conduction and an output signal is provided. The output signal from control logic 48 enables multiplexer driver 34 to conduct. Multiplexer driver 34 then closes corresponding switches 38. More specifically, switch 38-1 is closed connecting station 12-1 to bus bar 36 and switch 38-18 is also closed coupling positive current source 42 to bus bar 36 via line 168. A positive polarity control signal having a constant current is then delivered to station 12-1.

If another signal was desired to be delivered, test logic 70 would be used. A high signal would be given on line 69 and line 72 would go high thus ensuring that no further update is presently provided.

Clock divider 52 also provides one pulse for each sixteen pulses received from clock source 58 to magnitude register 26 via line 62 as shown in FIG. 3F. For each transistion period in the middle of the pulse, the binary count stored in magnitude register 26 is incremented. In the preferred example, however, only one binary pulse to magnitude register 26 is needed. At time $t_4$ the binary count in magnitude register 26 is incremented and this results in an overflow condition. On the next transition, i.e., at time $t_5$, the pulse from clock divider 52 is completed and a signal is generated over carry line 66. This signal is low and is called an interrupt signal.

The interrupt signal provides a low input to gate 54. Since the output of gate 54 is high and the other input is low, the change of signal has no effect on the output of gate 54. The interrupt signal also changes one input to gate 49. Since both inputs to gate 49 are now low, gate 49 provides a high signal. This high signal has no effect on gate 54 since the other input lead is now low. However, the high output signal of gate 49 is also coupled as one input to gate 47. This high signal resets gate 47 with a corresponding change in its output from high to low. The low output signal from gate 47 disables control logic 48 inhibiting any further signal from control logic 48. As a result, the switches in multiplexer driver 34, i.e., switches 34-1 and 34-18 are opened and these in turn open the switches 38-1 and 38-18 thereby stopping the control signal from being delivered to remote station 12-1. Station 12-1 now has the proper charge to perform its intended operation.

Since gate 54 continues to provide a high signal to gate 56, the pulses to clock 52 from clock source 58 are transmitted. At the transition time of the next pulse to magnitude register 26, i.e., at time $t_6$, the interrupt signal on carry line 66 changes from low to high. Gate 54 now has two high signals at its input and its output goes from high to low. This low signal is provided to gate 56 and inhibits any transmission by gate 56. Hence, no further pulses from clock source 58 are provided to clock divider 52. The high signal on carry line 66 is also provided to one input lead of gate 49. However, this has no effect since the other lead is low and hence the output of gate 49 remains high. The 5 microsecond interrupt signal provides an inherent delay such that the switches of the station interface unit 16 are disabled and the interface unit can ready itself for another operation.

It is apparent that by Applicant's invention by which remote stations may be driven with variable duration current pulses of selectable polarity and fixed amplitude, significant changes in the embodiment of a station interface unit are provided. These changes from the prior art such as a reliable fixed amplitude current source and the elimination of relays with their associated power supplies and drivers provide significant cost reduction. Moreover, the variable width pulses needed by Applicant are created by using a storage register which is required in either embodiment.

While there has been shown, described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for coupling a processor to a first station, said apparatus comprising:
   means for storing an input signal provided by said processor, said input signal comprising a representation of a duration,
   means for generating a control signal,
   means for controlling the transmission of said control signal from said generating means,
   means responsive to said input signal for regulating the duration during which said control signal is transmitted from said controlling means to said first station,
   whereby said first station in response to said control signal provides a predetermined operation.

2. An apparatus as defined in claim 1 wherein said generating means includes:
   a positive current source for providing a positive substantially constant current control signal to said first station,
   a negative current source for providing a negative substantially constant current control signal to said first station, and
   wherein said apparatus further includes means for selecting said control signal from either said positive current source or said negative current source.

3. An apparatus as defined in claim 2 wherein said regulating means includes:

clock means for providing a first series of clock pulses,
timing means coupled to said clock means for altering said first series of clock pulses and providing a second series of clock pulses to said storing means, and
means responsive to said second series of pulses for changing said input signal such that said control signal is regulated.

4. An apparatus as defined in claim 3 wherein said storing means includes a magnitude register and a sign register, each of which holds a part of said input signal therein,
   said magnitude register coupled to receive said second series of pulses from said timing means and providing a signal to said controlling means for regulating the duration of said control signal,
   said sign register coupled to said source means and selecting one of said source means such that the polarity of said control signal is determined.

5. An apparatus as defined in claim 4 wherein:
   said magnitude register provides a carry signal when said part of input signal representing a duration indicates that said duration is completed, and
   said carry signal provides an interrupt of predetermined duration.

6. An apparatus as defined in claim 5 and further including:
   enabling means coupled to said magnitude register for enabling transmission of said first series of pulses from said clock means to said timing means, said enabling means responsive to said carry signal and providing said interrupt for the duration of said carry signal.

7. An apparatus for coupling a processor to a plurality of stations, said apparatus comprising:
   a plurality of storing means each for receiving different segments of an input signal provided by said processor,
   source means coupled to said plurality of stations for generating a control signal,
   address means coupled to one of said plurality of storing means and responsive to one segment of said input signal for selecting one station of said plurality of stations,
   regulating means responsive to a second segment of said input signal for regulating the duration of said control signal, and
   control means coupled to said address means and said regulating means for controlling the transmission of said control signal, said control means enabling said address means to select said one station and said source means to transmit said control signal to said one station.

8. An apparatus as defined in claim 7 wherein said regulating means includes:
   clock means for providing a first series of clock pulses,
   timing means coupled to said clock means for altering said first series of clock pulses and providing a second series of clock pulses, and
   wherein said control means is responsive to said second series of clock pulses from said timing means to enable said address means and said source means.

9. An apparatus as defined in claim 8 wherein said regulating means further includes:

a second storing means of said plurality of said storing means, said second storing means storing said second segment of input signal, said timing means providing a third series of clock pulses to said second storing means, said third series of pulses changing the representation of said second segment, said second storing means providing a carry signal when said representation of said second segment indicates that said control signal is completed.

10. An apparatus as defined in claim 9 wherein said control means includes control logic and busy logic:

said control logic responsive to said timing means and enabling said address means to select said one station, said busy logic responsive to said carry signal from said second storing means and disabling said control logic, said control logic, in turn disabling said address means.

11. An apparatus as defined in claim 10 and further including:

enabling means for enabling said clock means, said enabling responsive to said carry signal and providing an interrupt period, said enabling means also responsive to said busy logic for ending said interrupt period.

12. An apparatus as defined in claim 11 wherein said source means includes:

a positive current source for providing said control signal in the form of a positive, substantially constant current, a negative current source for providing said control signal in the form of a negative, substantially constant current, and means responsive to a third segment of said input signal stored in a third of said plurality of storing means for selecting either said positive or said negative current source.

13. An apparatus as defined in claim 12 wherein said one station includes:

capacitive storage means for storing a charge, an element responsive to the magnitude of said charge in said capacitive storage means, and wherein said control signal is coupled to charge said capacitive storage means to a predetermined storage level as determined by said input signal.

* * * * *